(12) United States Patent
Ortega et al.

(10) Patent No.: US 7,828,368 B2
(45) Date of Patent: Nov. 9, 2010

(54) VEHICLE UNDERBODY FAIRING

(75) Inventors: Jason M. Ortega, Pacifica, CA (US);
Kambiz Salari, Livermore, CA (US);
Rose McCallen, Livermore, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 184 days.

(21) Appl. No.: 12/255,906

(22) Filed: Oct. 22, 2008

(65) Prior Publication Data

US 2009/0146453 A1 Jun. 11, 2009

Related U.S. Application Data

(60) Provisional application No. 60/982,002, filed on Oct. 23, 2007.

(51) Int. Cl.
*B62D 35/02* (2006.01)
(52) U.S. Cl. .................................................. 296/181.5
(58) Field of Classification Search ............. 296/181.5, 296/180.1, 180.4
See application file for complete search history.

(56) References Cited

U.S. PATENT DOCUMENTS

| | | | |
|---|---|---|---|
| 4,343,506 A | 8/1982 | Saltzman | |
| 4,418,853 A | 12/1983 | Shaffer | |
| 4,640,541 A * | 2/1987 | FitzGerald et al. | 296/180.1 |
| 5,280,990 A | 1/1994 | Rinard | |
| 6,575,522 B2 * | 6/2003 | Borghi et al. | 296/180.5 |
| 6,644,720 B2 * | 11/2003 | Long et al. | 296/180.4 |
| 6,974,178 B2 | 12/2005 | Ortega | |
| 7,093,889 B2 * | 8/2006 | Graham | 296/180.4 |
| 7,578,541 B2 * | 8/2009 | Layfield et al. | 296/180.2 |
| 2003/0057736 A1 * | 3/2003 | Long et al. | 296/180.4 |
| 2008/0303309 A1 * | 12/2008 | Dayton | 296/180.1 |
| 2008/0303311 A1 * | 12/2008 | Roush | 296/180.4 |
| 2009/0189414 A1 * | 7/2009 | Boivin et al. | 296/180.4 |

FOREIGN PATENT DOCUMENTS

CA 1 156 293 A1 11/1983

OTHER PUBLICATIONS

Cooper, Kevin R. "Truck Aerodynamics Reborn-Lessons from the Past". Aerodynamics Laboratory, NRC Canada. Vehicle Dynamics, Braking, Steering and Suspensions (SP-1814). SAE Technical, Paper Series 2003-1-3376, 2003 SAE International Truck and Bus Meeting and Exhibition, Fort Worth, Texas, Nov. 10-12, 2003.

* cited by examiner

*Primary Examiner*—H Gutman
(74) *Attorney, Agent, or Firm*—James S. Tak

(57) ABSTRACT

A vehicle underbody fairing apparatus for reducing aerodynamic drag caused by a vehicle wheel assembly, by reducing the size of a recirculation zone formed under the vehicle body immediately downstream of the vehicle wheel assembly. The fairing body has a tapered aerodynamic surface that extends from a front end to a rear end of the fairing body with a substantially U-shaped cross-section that tapers in both height and width. Fasteners or other mounting devices secure the fairing body to an underside surface of the vehicle body, so that the front end is immediately downstream of the vehicle wheel assembly and a bottom section of the tapered aerodynamic surface rises towards the underside surface as it extends in a downstream direction.

24 Claims, 7 Drawing Sheets

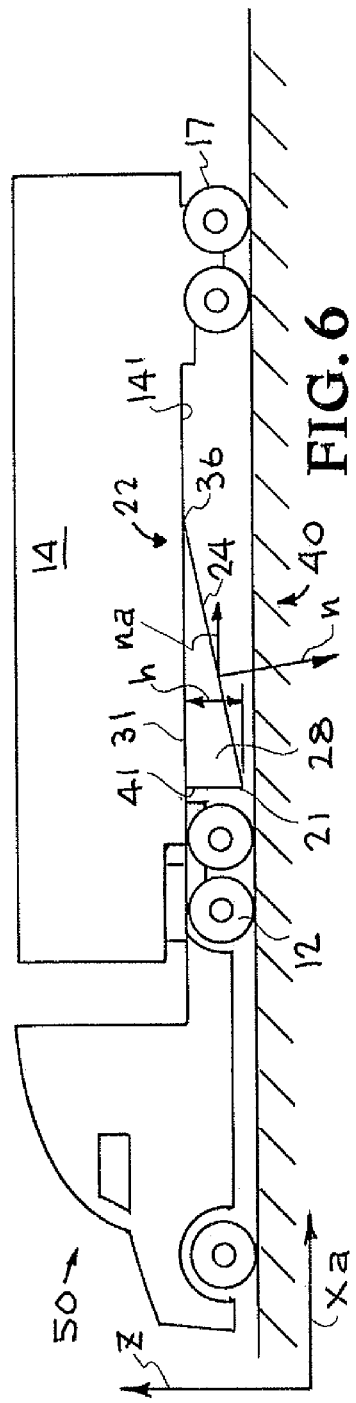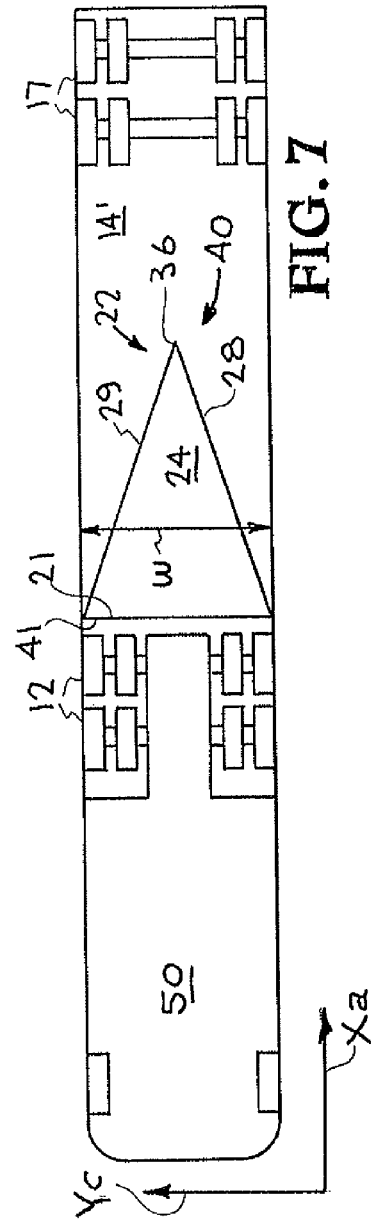

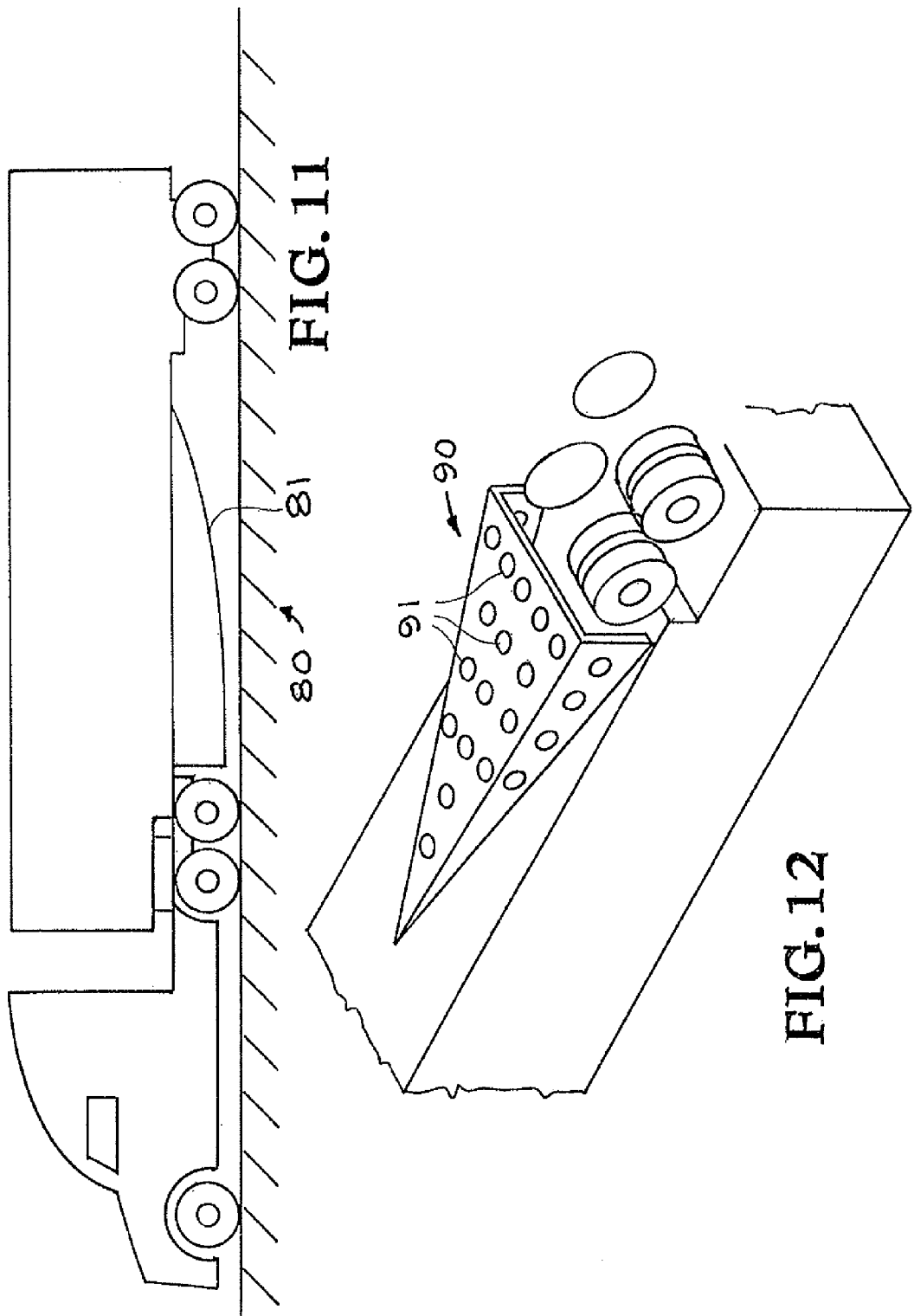

VEHICLE UNDERBODY FAIRING

I. CLAIM OF PRIORITY IN PROVISIONAL APPLICATION

This application claims priority in provisional application filed on Oct. 23, 2007, entitled "Drag Reduction of a Heavy Vehicle by Means of a Trailer Underbody Fairing" Ser. No. 60/982,002, by Jason M. Ortega et al, and incorporated by reference herein.

II. FEDERALLY SPONSORED RESEARCH OR DEVELOPMENT

The United States Government has rights in this invention pursuant to Contract No. DE-AC52-07NA27344 between the United States Department of Energy and Lawrence Livermore National Security, LLC for the operation of Lawrence Livermore National Laboratory.

III. FIELD OF THE INVENTION

The present invention relates to aerodynamic drag reduction methods. The invention relates more particularly to an underbody fairing apparatus for reducing the underbody drag of a heavy vehicle produced by a wheel assembly supporting the vehicle.

IV. BACKGROUND OF THE INVENTION

It is well known in the art of vehicle design that the fuel consumption of a vehicle associated with its movement is directly related to certain aerodynamic characteristics of the vehicle, such as the aerodynamic drag of the vehicle expressed as the drag coefficient, $C_d$. As the aerodynamic drag experienced by a vehicle increases, the fuel costs also correspondingly increase due to the greater energy required to overcome the drag. For example, for a vehicle traveling 70 mph on a roadway, approximately 65% of the total fuel consumption of its engine is used to overcome aerodynamic drag. Thus, even a slight reduction in the aerodynamic drag coefficient of the vehicle can result in a significant improvement in fuel economy. This is especially true for bluff body vehicles, such as semi-trailer trucks ("semi's") and other heavy vehicles having a tall and wide frontal profile. FIG. 1 shows a conventional semi-trailer truck 10 having a tractor-trailer arrangement with a trailer 13 hitched to a tractor 11. The tractor 11 has a drive wheel assembly 12, and the trailer 13 is a semi-trailer type having a trailer body 14 with a rear end 16 supported by a rear wheel assembly 17 and a front end 15 (without a front axle) hitched to the tractor 11 above the tractor's drive wheel assembly 12.

One of the sources of aerodynamic drag on a vehicle is underbody drag caused by airflow separation from a forward-located vehicle wheel assembly (e.g. a front axle) which forms a recirculation zone under the vehicle body directly behind (immediately downstream of) the wheel assembly and reduces the pressure on the rear or base of the wheel assembly. In the case of heavy vehicles such as the semi 10 in FIG. 1, the underbody recirculation zone 18 shown under the trailer body 14 directly behind the tractor's drive wheel assembly 12 is particularly large due to the high ground clearance of the trailer body and the sizeable (tall and wide) cross-sectional area of the tractor's drive wheel assembly. One device known in the art for reducing such trailer underbody drag is an underbody skirt, such as 19 shown in FIGS. 2 and 3, that extends below the trailer body 14 of the semi 10, one on each side of the trailer body. However, as also shown in FIGS. 2 and 3, a potential problem with such underbody skirts is inadequate ground clearance when the semi travels over a raised, protruding, undulating, or otherwise uneven part of the travel surface. This is due to the lower position of the skirt relative to the trailer body, together with the relatively long wheel base, i.e. the distance between the tractor's drive wheel assembly and the trailer rear wheel assembly. In particular, FIG. 2 illustrates the underbody trailer skirt 19 coming in contact with a railroad track at a railroad crossing 2, and FIG. 3 illustrates the underbody trailer skirt 19 coming in contact with a transition surface of a ramp leading into a sunken loading dock 3. In either case, substantial damage may result to the skirt due to inadequate ground clearance.

Thus there is a need for an aerodynamic drag reduction apparatus which reduces underbody drag of a vehicle, especially heavy vehicles such as semi-trailer trucks, caused by a wheel assembly supporting the vehicle body, while also overcoming the ground clearance problem.

V. SUMMARY OF THE INVENTION

One aspect of the present invention includes a vehicle underbody fairing apparatus for reducing aerodynamic drag caused by a vehicle wheel assembly supporting a vehicle body from thereunder, comprising: a fairing body having a fairing front end, a fairing rear end, and a tapered aerodynamic surface comprising a bottom section flanked by left and right side sections which together extend from the fairing front end to the fairing rear end with a substantially U-shaped cross-section that tapers in both height and width; and mounting means for securing the fairing body to an underside surface of the vehicle body, so that the fairing front end is adjacent to and downstream of the vehicle wheel assembly and the bottom section of the tapered aerodynamic surface rises towards the underside surface of the vehicle body as it extends downstream from the fairing front end to the fairing rear end, whereby the mounted fairing body reduces the size of a recirculation zone formed under the vehicle body immediately downstream of the vehicle wheel assembly.

Another aspect of the present invention includes a vehicle underbody fairing apparatus for reducing aerodynamic drag caused by a vehicle wheel assembly supporting a vehicle body from thereunder, comprising: a fairing body having a fairing front end, a fairing rear end, and a tapered aerodynamic surface comprising a bottom section flanked by left and right side sections which together extend from the fairing front end to the fairing rear end with a substantially U-shaped cross-section that tapers in both height and width from a fairing front end height and width that are substantially equivalent to the height and width respectively of the vehicle wheel assembly to a vertex at the fairing rear end; and mounting means for securing the fairing body to an underside surface of the vehicle body, so that the fairing front end is adjacent to and downstream of the vehicle wheel assembly, the bottom section of the tapered aerodynamic surface rises towards the underside surface of the vehicle body as it extends downstream from the fairing front end to the fairing rear end, and the vertex is at substantially the same level as the underside surface of the vehicle body, whereby the mounted fairing body reduces the size of a recirculation zone formed under the vehicle body immediately downstream of the vehicle wheel assembly.

And another aspect of the present invention includes an aerodynamic semi-trailer for use in tractor-trailer towing arrangements, comprising: a trailer body with a trailer front end and a trailer rear end; a rear wheel assembly supporting the trailer rear end from thereunder; a hitch located under the trailer front end for connecting the trailer body to a tractor so that a drive wheel assembly of the tractor supports the trailer front end from thereunder; and a fairing body located under the trailer body between the front and rear wheel assemblies, said fairing body having a fairing front end adjacent to and downstream of the drive wheel assembly of the tractor when the trailer body is hitched thereto, a fairing rear end downstream of the fairing front end, and a tapered aerodynamic surface comprising a bottom section flanked by left and right side sections which together extend downstream from the fairing front end to the fairing rear end with a substantially U-shaped cross-section that tapers in both height and width, said bottom section rising towards the underside surface of the vehicle body as it extends downstream from the fairing front end to the fairing rear end, whereby the mounted fairing body reduces the aerodynamic drag caused by the vehicle wheel assembly by reducing the size of a recirculation zone formed under the vehicle body immediately downstream of the vehicle wheel assembly.

The present invention is directed to an a vehicle underbody fairing apparatus for use with vehicles generally having a vehicle body supported by a forward wheel assembly located under a front end of the vehicle body and by a rear wheel assembly located under a rear end of the vehicle body. In particular, the present invention is an underbody fairing apparatus for use with vehicles having a tall and wide frontal profile, such as semi-trailer trucks or other heavy vehicles having a high ground clearance and a large underbody recirculation zone behind the forward wheel assembly, as discussed in the Background section. With regard to the tractor-trailer towing arrangements of semi's, it is appreciated that the tractor's drive wheel assembly is considered the forward wheel assembly of the trailer body when hitched to the tractor, since a semi-trailer has a rear wheel assembly but not a front axle. In the present discussion, the conventional tractor-trailer arrangement of semi-trailer trucks has been selected as a representative wheeled vehicle to illustrate the problem of aerodynamic underbody drag caused by forward wheel assemblies, as well as showcase the solutions provided by the various embodiments of the present invention, but the present invention is not limited only to such. As used herein and in the claims, "wheel assembly" includes any combination of wheels, tires, axles, differentials, and other wheel-related structure, such as struts, shocks, springs, control arms, etc., or any portions thereof, located or extending below the vehicle body as a unit group.

The underbody fairing apparatus includes two main components: (1) a fairing body having a wide, broad-faced fairing front end, a substantially narrower fairing rear end, and a tapered aerodynamic surface having a bottom section flanked by left and right side sections which together extend from the fairing front end to the fairing rear end with a substantially U-shaped cross-section that tapers in both height and width; and (2) mounting hardware for securing the fairing body to an underside surface of the trailer body so that the front end of the fairing body is adjacent to and downstream of (immediately downstream of) the tractor's drive wheel assembly and a bottom section of the tapered aerodynamic surface rises towards the underside surface of the vehicle body as it extends downstream from the fairing front end to the fairing rear end. When placed in a flowstream in this manner, the underbody fairing apparatus is designed to reduce the size of the recirculation zone on the rear or base of the drive wheel assembly which consequently reduces the overall aerodynamic drag of the vehicle. It is appreciated that the term "fairing" is used herein as a member, structure, or external surface of a vehicle whose primary function is to produce a smooth outline and to reduce drag. And it is appreciated that the mounting hardware can include common fasteners (bolts, nuts, etc), latches, hooks, ties, adhesives, magnets, etc. or other securing methods used for temporary or permanent attachment.

Several advantages may be achieved with the underbody fairing apparatus of the present invention. First, due to the tapering of the height and width from an upstream position to a downstream position between the tractor drive wheels and the rear wheels, the underbody fairing apparatus does not limit access to the trailer rear, which will allow shipping and receiving handlers to easily open and close the trailer cargo doors. Also, since the fairing body becomes narrower farther downstream from the tractor drive wheels, there is sufficient ground clearance for traveling over railroad crossings and backing into sunken loading docks without fear of damaging the fairing body. And the fairing is also completely passive such that it does not require any driver involvement for deployment or proper functioning. Therefore, once it is installed on the trailer, it does not require any further attention. As suggested by CFD (computational fluid dynamics) simulations performed by Applicants, the underbody fairing apparatus of the present invention may be optimized in various ways, such as by changing the length of the fairing body, by rounding and contouring its edges, etc.

VI. BRIEF DESCRIPTION OF THE DRAWINGS

The accompanying drawings, which are incorporated into and form a part of the disclosure, are as follows:

FIG. 6 is a side view of a semi with the underbody fairing apparatus of FIG. 5 mounted thereon.

FIG. 7 is a bottom view of the semi and underbody fairing apparatus of FIG. 6.

FIG. 11 is a side view of an exemplary fifth embodiment of the vehicle underbody fairing apparatus where the bottom section of the tapered aerodynamic surface has a curvilinear taper.

FIG. 12 is a bottom perspective view of an exemplary sixth embodiment of the vehicle underbody fairing apparatus having perforations on the tapered aerodynamic surface.

VII. DETAILED DESCRIPTION

Figure 1:
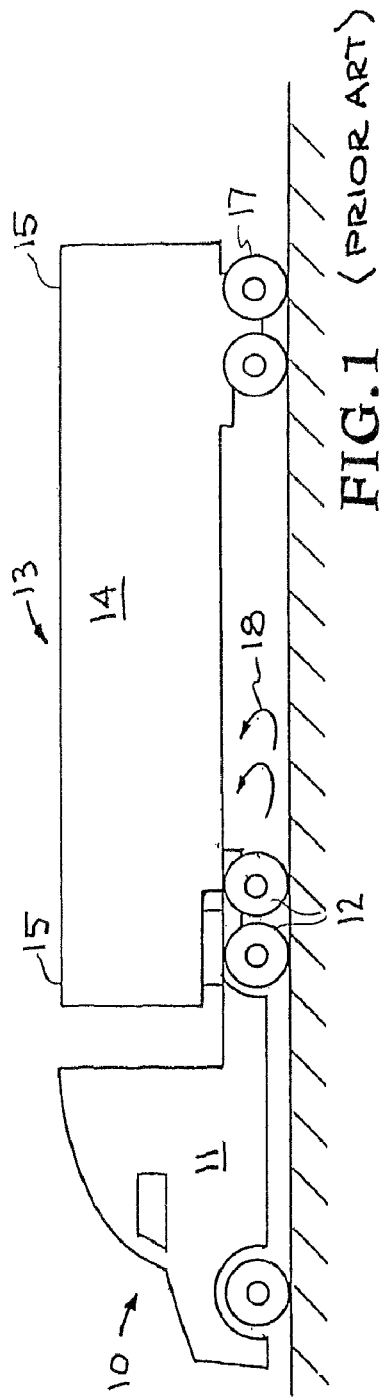
FIG. 1 is side view of a conventional semi-trailer truck illustrating the recirculation zone formed immediately downstream of the drive wheel assembly under the trailer body.
Figure 2:
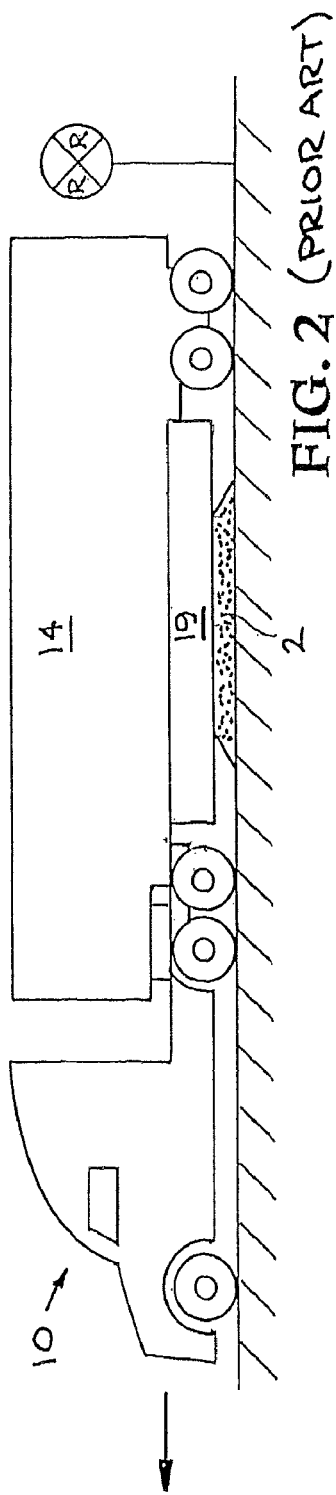
FIG. 2 is a side view of the conventional semi of FIG. 1 fitted with a trailer side skirt known in the art, illustrating an underbody clearance problem over a railroad crossing.
Figure 3:
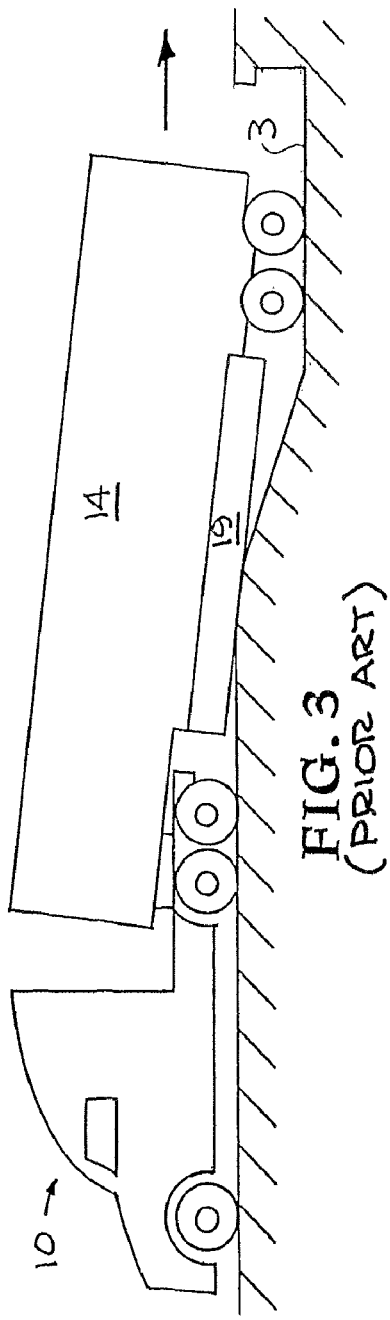
FIG. 3 is a side view of the conventional semi with trailer side skirt of FIG. 2, illustrating an underbody clearance problem at a sunken loading dock.
Figure 4:
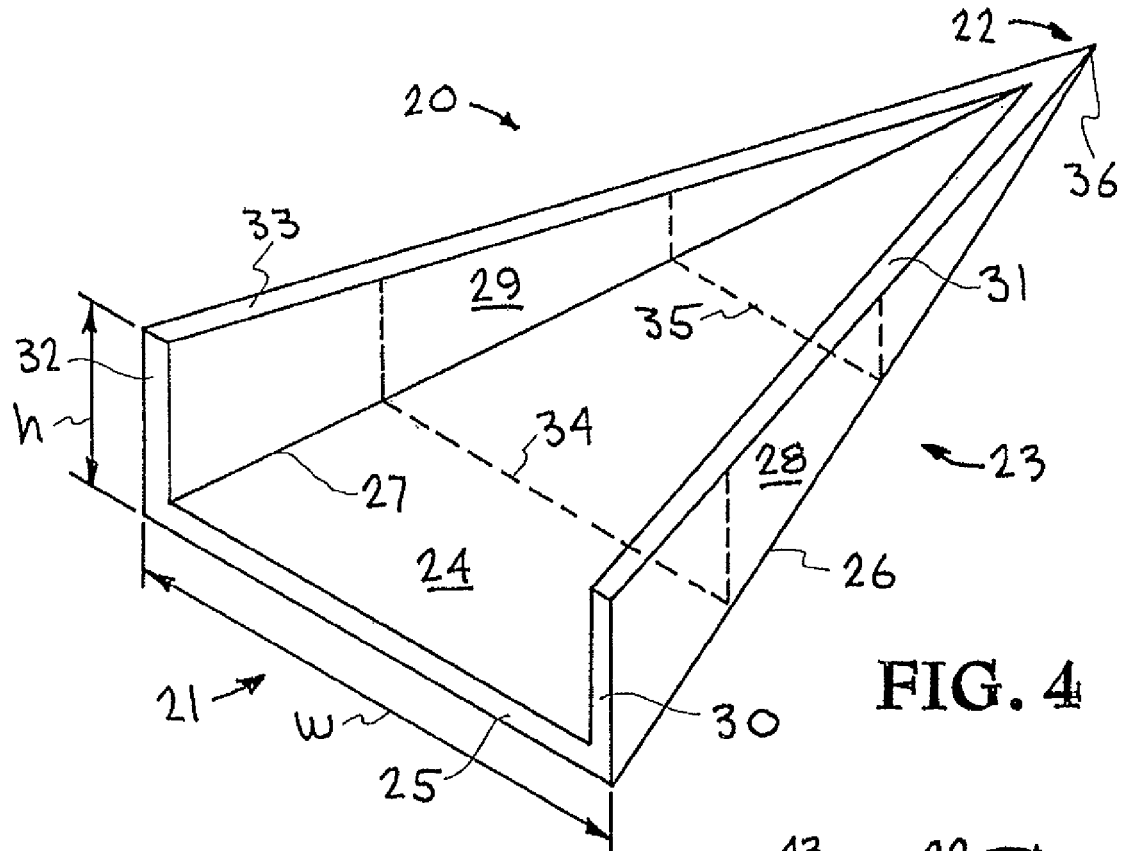
FIG. 4 is a perspective view of an exemplary first embodiment of the vehicle underbody fairing apparatus of the present invention.

Turning now to the drawings, FIG. 4 shows a first example embodiment of the vehicle underbody fairing apparatus of the present invention. In particular, FIG. 4 illustrates only the fairing body 20 of the underbody fairing apparatus, with the mounting device/method used for securing the fairing body to a vehicle body not shown. The fairing body 20 may be generally characterized as being wedge shaped, and has a fairing front end 21, a fairing rear end 22, and a tapered aerodynamic surface 23 comprising a bottom section 24 flanked by left 28 and right 29 side sections which together extend from the fairing front end 21 to the fairing rear end 22. The left and right side sections 28, 29 are shown in an upright position with upper edges 31 and 33, respectively, front edges 30 and 32, respectively, and connected along their respective lower edges to the left and right edges, respectively, of the bottom section 24. The lower edge of the left side section 28 and the left edge of the bottom section 24 are shown intersecting and indicated at reference character 26, and the lower edge of the right side section 29 and the right edge of the bottom section 24 are shown intersecting and indicated at reference character 27. Connected in this manner, the bottom section 24 and the left and right side sections 28, 29 together form a substantially U-shaped cross-section across the length of the fairing body. It is appreciated that the connection of the bottom section 24 to each of the left and right side sections 28, 29 may be either by attachment/joining of separate/discrete panel surfaces, or by the formation of a unitary body having integrally formed bottom and left/right side sections of the tapered aerodynamic surface. It is also appreciated that various material types may be used for the construction of the fairing body, such as lightweight rigid plastics, metals, composites, or other materials having a sufficiently rigid construction.

FIG. 4 also shows the substantially U-shaped cross-section tapering (i.e. becoming progressively smaller and diminishing gradually toward one end) in both height and width as the tapered aerodynamic surface 23 extends from the fairing front end 21 to the fairing rear end 22. This is illustrated by the reduction in both the height h and width w of the U-shaped cross-section between two longitudinally spaced positions along the fairing body, i.e. an upstream location indicated at line 34 and a downstream location indicated at line 35. As such, the U-shaped cross-section at the front end 21 of the fairing body 20 has the largest height and width, and the U-shaped cross-section at the rear end 22 of the fairing body 20 has the smallest height and width. In FIG. 4, the front end 21 is shown comprising front edge 25 of the bottom section 24, front edge 30 of the left side section 28, and front edge 32 of the right side section 29, which together define the frontal profile of the fairing body 20. In one preferred embodiment, the width w of the frontal profile is substantially equivalent to the width of a cross-section of the upstream-located vehicle wheel assembly, e.g. a tractor drive wheel assembly. In another preferred embodiment, both the height h and width w, of the frontal profile is substantially equivalent to the height and width, respectively, of the cross-section of the upstream-located vehicle wheel assembly. And the rear end 22 of the fairing body 20 is shown as an intersection point, i.e. a vertex 36, of the bottom section surface and the left and right side section surfaces, such that the height and width of the U-shaped cross-section at the intersection point is zero. However, the term "vertex" is used herein and in the claims to generally characterize the rear end 22 as having a substantially reduced cross-section (when compared to the front end 21) with a height and width that may be zero or near zero. As such the vertex 36, while shown as a sharp end point, may alternatively have a rounded, blunt, or otherwise non-pointy terminous.

Figure 5:
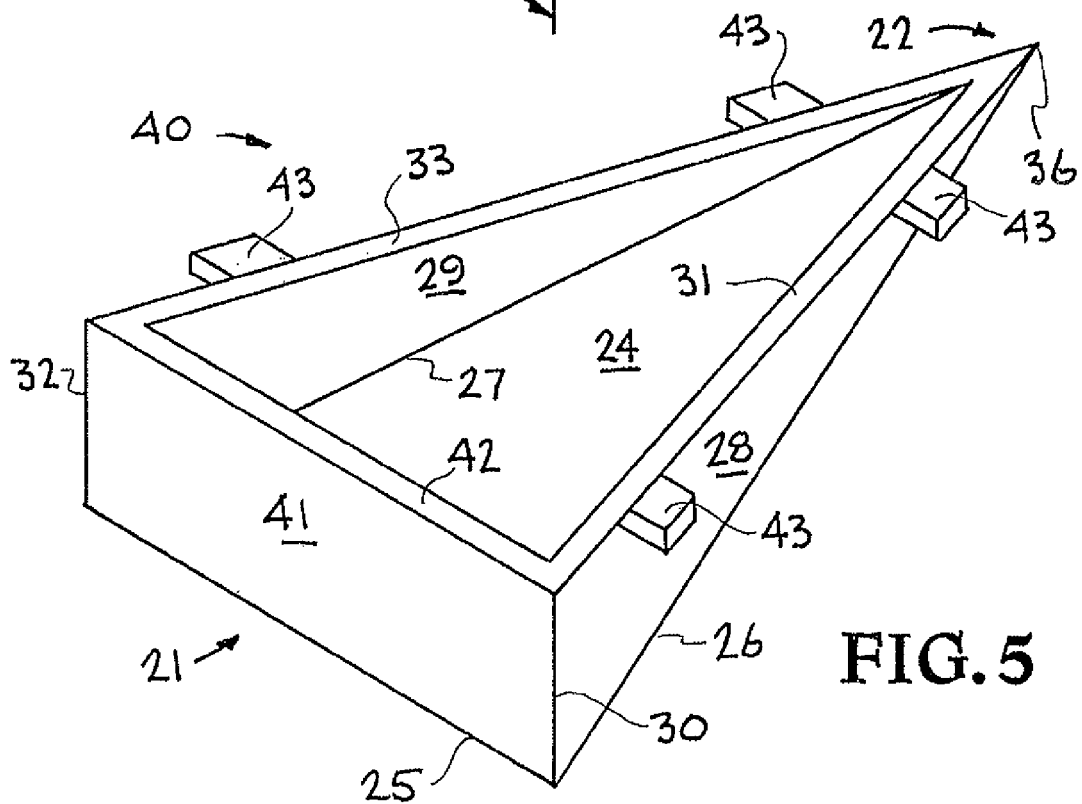
FIG. 5 is a perspective view of an exemplary second embodiment of the vehicle underbody fairing apparatus of the present invention similar to FIG. 4 but also including a front panel, and shown with mounting tabs.

FIG. 5 shows a second example embodiment of a fairing body 40 of the underbody fairing apparatus, having a similar construction as the embodiment 20 in FIG. 4, but also including a front panel 41 at the front end 21 which is connected edgewise (i.e. edge-to-edge connection made between an edge of a first surface with an edge of a second surface) to the tapered aerodynamic surface 24 at the front end 21. In particular, a lower end of the front panel 41 is connected to the front edge 25 of the bottom section 24, and left and right ends of the front panel 41 are respectively connected to the front edge 30 of the left side section 28 and the front edge 32 of the right side section 29. As such, the shape of the front panel 41 is substantially the same as the front profile of the U-shaped cross-section at the front end 21. And because of its upright and forward-facing orientation at the front end 21 of the fairing body 20, the front panel 41 may also be characterized as a forward-facing surface. As shown in FIG. 5, the addition of the front panel 41 partially encloses a fairing body volume, with only the top (defined by upper edges 31, 33, and 42) being open. It is appreciated, however, that the fairing body is preferably mounted with its upper edges 31, 33, and 42 positioned substantially flush against the underside surface of a vehicle body (see FIG. 6), so that an optional top panel (not shown) is not necessary to cap the open top. FIG. 5 also shows mounting tabs 43 (four shown generically) which generally represent the mounting device necessary for securing the fairing body to an underside surface of the vehicle body. In this regard, various types of conventional fasteners and mounting devices may be used as known in the art.

Figure 8:
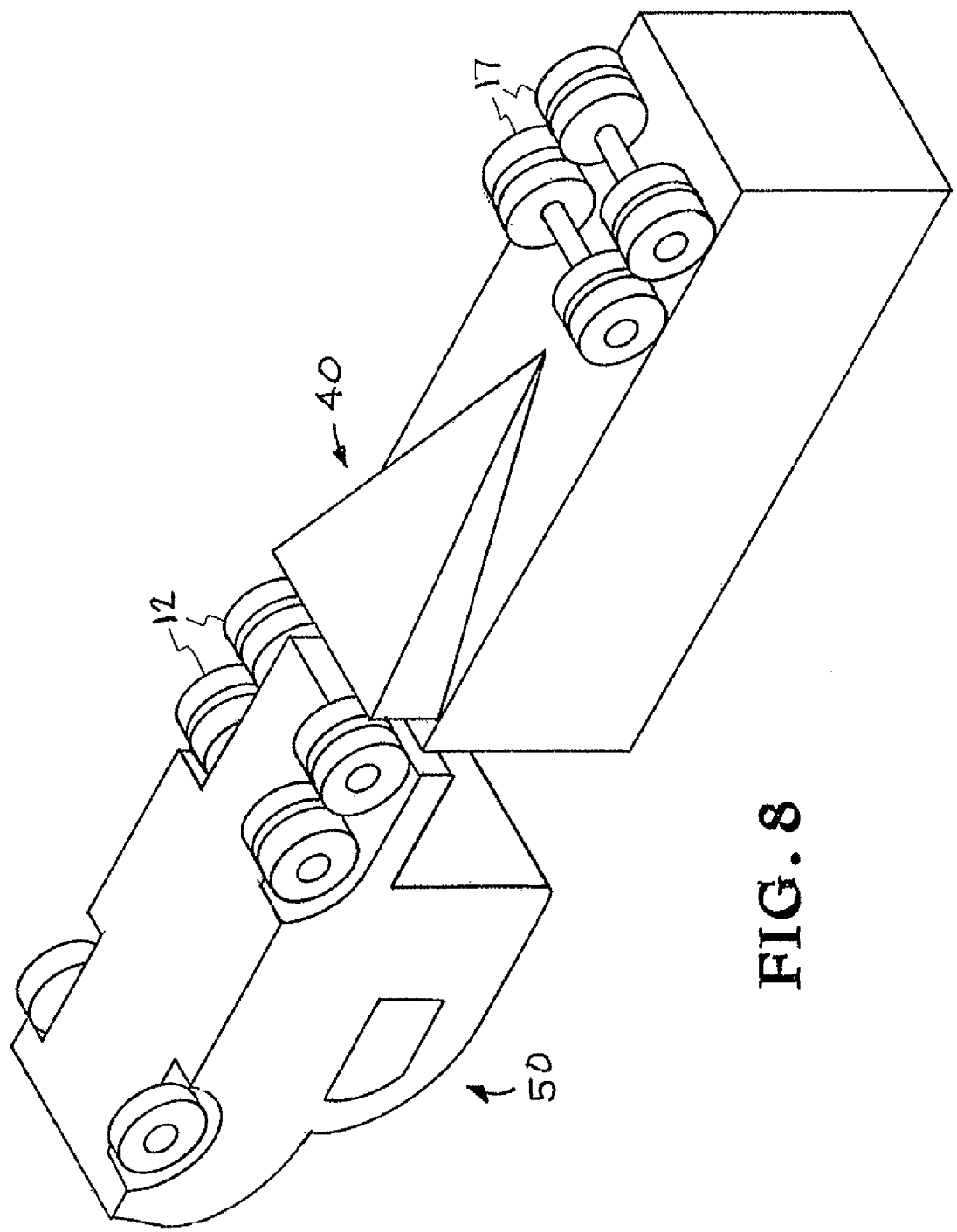
FIG. 8 is a bottom perspective view of the semi and underbody fairing apparatus shown in FIGS. 6 and 7.

FIGS. 6-8 illustrate the mounting and attachment of an underbody fairing apparatus, represented by fairing body 40 of FIG. 5, to a semi 50 and in particular to a trailer body 14 of the semi 50 having a front end supported by tractor drive wheel assembly 12 and a rear end supported by rear wheel assembly 17. The mounting devices or hardware discussed in FIG. 5 are used to secure the fairing body 40 to an underside surface 14' of the vehicle body, so that the fairing front end 21 with its large frontal profile is adjacent to and downstream of the drive wheel assembly 12 and the bottom section 24 of the tapered aerodynamic surface rises towards the underside surface 14' of the trailer body as it extends downstream from the fairing front end 21 to the fairing rear end 22. In the case where the rear end 22 terminates as a vertex, as shown in FIGS. 6-8, the mounting device secures the fairing body 40 so that the vertex is at substantially the same level as the underside surface of the trailer body. Additionally, the front panel 41 is provided and shown upright and substantially orthogonal to the travel surface of the vehicle. The bottom section 24 of the tapered aerodynamic surface 23 is shown with directional vector n orthogonal to the bottom section 24, and directional vector $n_a$ parallel to the ground plane. The height of the fairing body 40 is indicated at h in FIG. 6 shown substantially equivalent to the height of the tractor wheel assembly 12, and the width of the fairing body 40 is indicated at w in FIG. 7 shown substantially equivalent to the width of the tractor wheel assembly 12. And as can be best seen in FIG. 7, the fairing body 40 is centered along the central longitudinal axis of the semi 10.

While the fairing body is discussed primarily as a mountable/attachable apparatus separate from the trailer body 14 of the vehicle, the fairing body 40 shown in FIGS. 6-8 may also be considered, in the alternative, as an integrated part of the trailer body 14 which extends below the elevation of a conventional underbody surface 14'. In this case, the aerodynamically improved trailer body would be characterized as having an underbody fairing portion between the drive wheel assembly 12 (when hitched) and the rear wheel assembly 17, with a front end 21 located adjacent to and downstream of the drive wheel assembly 12.

Figure 9:
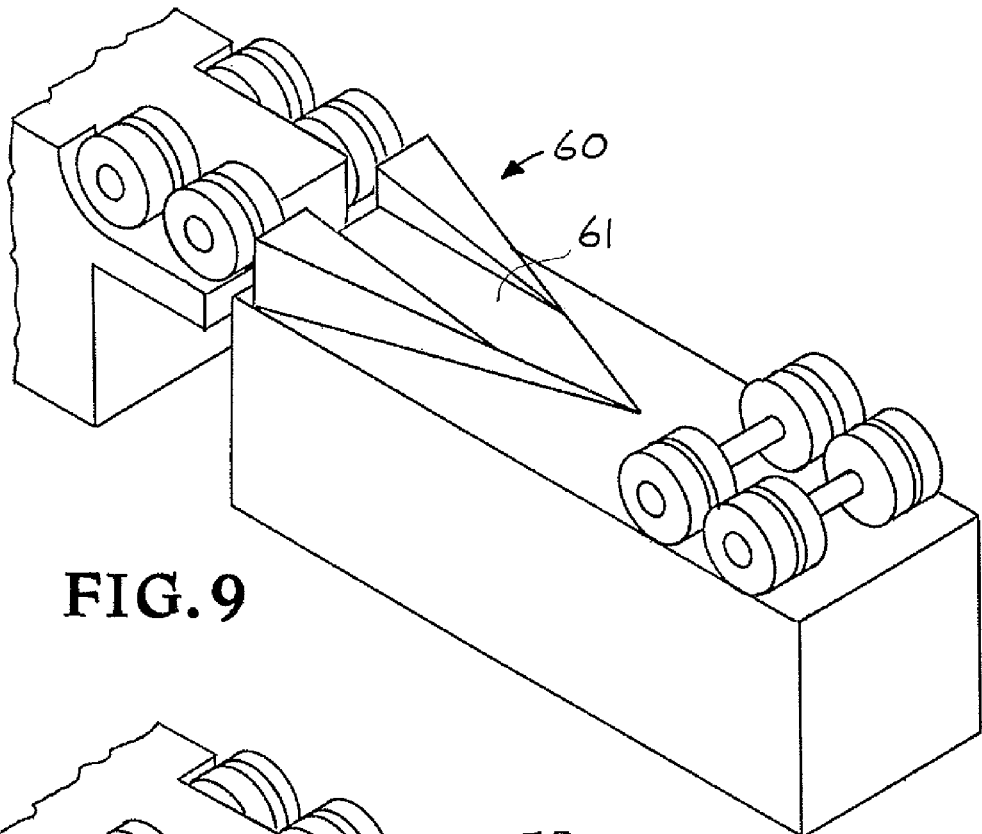
FIG. 9 is a bottom perspective view of an exemplary third embodiment of the vehicle underbody fairing apparatus having a recessed channel forming a flow channel.

FIG. 9 shows another embodiment of the underbody fairing apparatus of the present invention having a fairing body 60 with a recessed channel 61 on the bottom section of the tapered aerodynamic surface. The recessed channel has a generally inverted U-shape profile and a preferably centered, longitudinal orientation which serves to channel airflow coming from under an axle of the tractor's drive wheel assembly. As such, the inverted U-shape profile of the recessed channel 61 generally follows the inverted U-shape profile of the channel formed below the drive wheel axle, a left side drive wheel, and a right side drive wheel of the tractor's drive wheel assembly 12. While the recessed channel 61 modifies the lower half of the U-shaped cross-section of the tapered aerodynamic surface, it is still considered substantially U-shaped.

Figure 10:
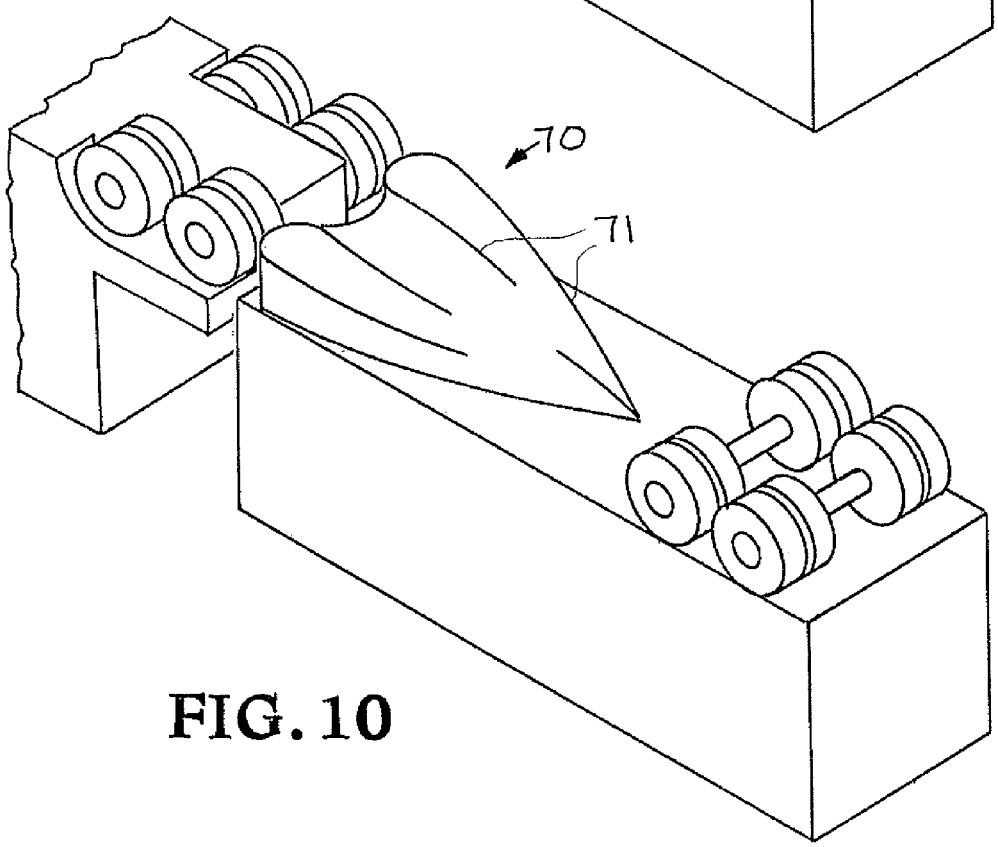
FIG. 10 is a bottom perspective view of an exemplary fourth embodiment of the vehicle underbody fairing apparatus similar to FIG. 8 but having contoured edges.

FIG. 10 shows another embodiment of the underbody fairing apparatus of the present invention having a fairing body 70 with its tapered aerodynamic surface contoured so as to be without sharp distinct edges. Contoured edges 71 are shown smoothly transitioning between various areas and sections of the tapered aerodynamic surface, (e.g. between bottom section and left and right side sections).

FIG. 11 shows another embodiment of the underbody fairing apparatus of the present invention having a fairing body 80 with at least one of the height and width of the substantially U-shaped cross-section tapering at a non-uniform rate so that the bottom section and/or the left and right side sections are curved. In this manner, as shown in FIG. 11, the bottom section 81 may have a convex curved shaped as it rises to the underside surface of the trailer body. Additionally, while not shown in the drawings, the width between the left and right side sections may also taper non-uniformly such that both have a convex curved shaped.

FIG. 12 shows another embodiment of the underbody fairing apparatus of the present invention having a fairing body 90 with a plurality of perforations 91 on its tapered aerodynamic surface. In particular, the fairing body 90 shown in FIG. 12 has perforations on the bottom section as well as the left and right side sections, but is not shown having a front panel.

Figure 13:
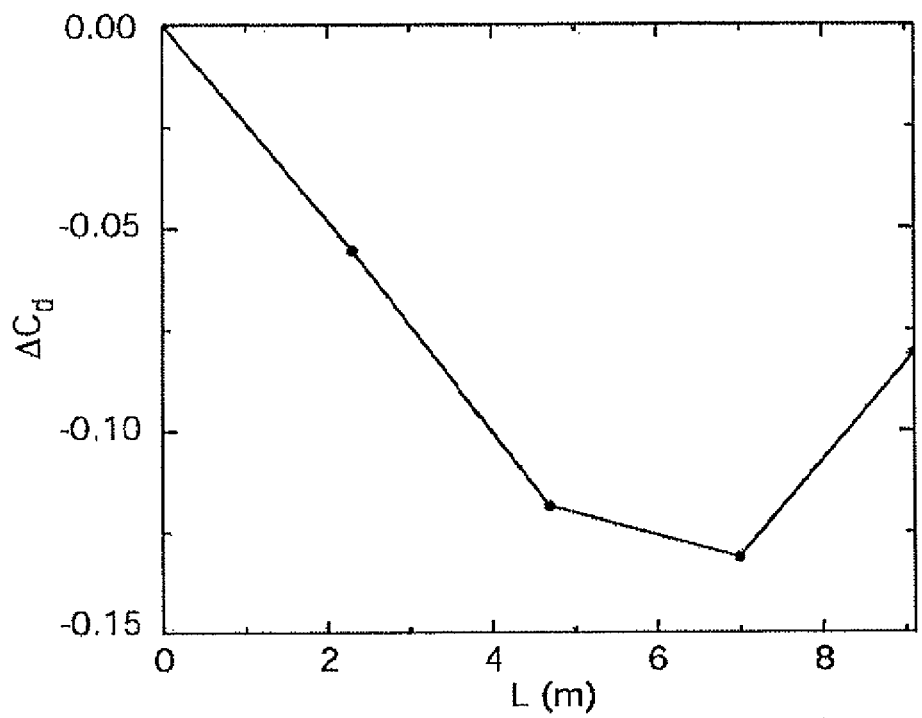
FIG. 13 is a graph showing the decrease in aerodynamic drag of the underbody fairing apparatus of FIG. 5 for four different fairing body length test cases L=2.3 m, 4.7 m, 7.0 m, and 9.1 m, when compared to no fairing used, based on computational fluid dynamics (CFD) simulations.
Figure 14:
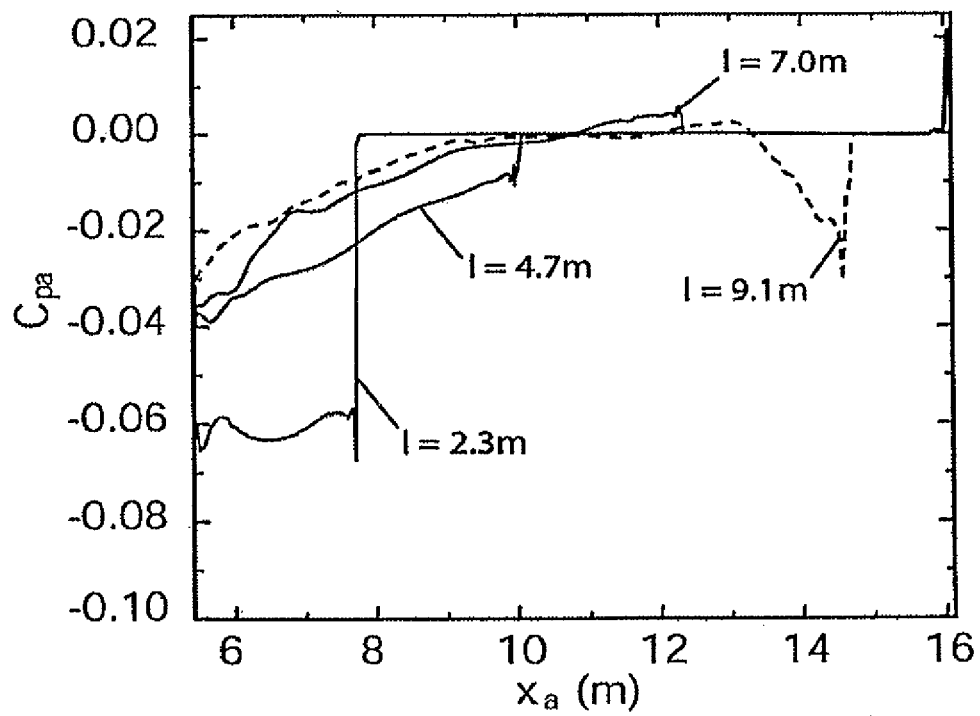
FIG. 14 is a graph showing the reduction of aerodynamic drag as evidenced by the increase in trailer underside pressure produced by each of the four different fairing body length test cases, L=2.3 m, 4.7 m, 7.0 m, and 9.1 m.

And FIGS. 13 and 14 are two graphs showing the results of computational fluid dynamics (CFD) modeling and simulations obtained by Applicants in the course of work performed at the Lawrence Livermore National Laboratory. In particular, FIG. 13 is a graph showing the decrease in aerodynamic drag of the underbody fairing apparatus of FIG. 5 for four different fairing body length test cases L=2.3 m, 4.7 m, 7.0 m, and 9.1 m, when compared to no fairing used. And FIG. 14 is a graph showing the increase in trailer underside pressure produced by each of the four different fairing body length test cases, L=2.3 m, 4.7 m, 7.0 m, and 9.1 m. The following simulation parameters were used:

(a) four different fairing body test cases, having width w=2.6 m, height h=0.8 m, and length l=2.3 m, 4.7 m, 7.0 m, and 9.1 m, (b) moving ground plane, $U_g = U_o = 29.1$ m/s, (c) inlet boundary velocity, $(U_g^2 + U_c^2)^{1/2} = 29.3$ m/s, (d) effective yaw angle, $\theta = \tan^-(U_c/U_g) = 6.1°$ (e) $Re_w = 5.0e6$ As can be seen in FIG. 13, while the aerodynamic drag decreased for all four length-varied test cases, the decrease in aerodynamic drag was greatest for the fairing body with l=7.0 m ($-\Delta C_{d\ max} = 0.13$). And as can be seen in FIG. 14, the pressure coefficient on acting along the body axis direction $n_a$, (see FIG. 6) and represented as:

$$C_{pa} = (p - p_o) n \cdot n_a / (\tfrac{1}{2} \rho U_o^2)$$

increases for the longer fairings. In this manner, the fairing body may be optimized and tailored to the specific dimensions and construction of the vehicle to achieve greatest drag reductions.

While particular embodiments and parameters have been described and/or illustrated, such are not intended to be limiting. Modifications and changes may become apparent to those skilled in the art, and it is intended that the invention be limited only by the scope of the appended claims.

We claim:

1. A vehicle underbody fairing apparatus for reducing aerodynamic drag caused by a vehicle wheel assembly supporting a vehicle body from thereunder, comprising:
    a fairing body having a fairing front end, a fairing rear end, and a tapered aerodynamic surface comprising a bottom section flanked by left and right side sections which together extend from the fairing front end to the fairing rear end with a substantially U-shaped cross-section that tapers in both height and width; and
    means for mountably securing the fairing body to an underside surface of the vehicle body, so that the fairing front end is adjacent to and downstream of the vehicle wheel assembly and the bottom section of the tapered aerodynamic surface rises towards the underside surface of the vehicle body as the tapered aerodynamic surface extends downstream from the fairing front end to the fairing rear end,
    whereby the mounted fairing body reduces the size of a recirculation zone formed under the vehicle body immediately downstream of the vehicle wheel assembly.

2. The vehicle underbody fairing apparatus of claim 1,
    wherein the width of the substantially U-shaped cross-section at the front end is substantially equivalent to the width of the vehicle wheel assembly.

3. The vehicle underbody fairing apparatus of claim 2,
    wherein the height of the substantially U-shaped cross-section at the front end is substantially equivalent to the height of the vehicle wheel assembly.

4. The vehicle underbody fairing apparatus of claim 1,
    wherein the substantially U-shaped cross-section tapers to a vertex at the fairing rear end, and the means for mountably securing secures the fairing body so that the vertex is at substantially the same level as the underside surface of the vehicle body.

5. The vehicle underbody fairing apparatus of claim 1,
    wherein the fairing body includes a front panel connected edgewise to the tapered aerodynamic surface at the fairing front end.

6. The vehicle underbody fairing apparatus of claim 1, wherein the bottom section of the tapered aerodynamic surface has a recessed channel for channeling airflow coming from under an axle of the vehicle wheel assembly.

7. The vehicle underbody fairing apparatus of claim 1, wherein the tapered aerodynamic surface is contoured so as to be without sharp edges.

8. The vehicle underbody fairing apparatus of claim 1, wherein at least one of the height and width of the substantially U-shaped cross-section tapers at a non-uniform rate so that the bottom section is curved if the height tapers at the non-uniform rate and the left and right side sections are curved if the width tapers at the non-uniform rate.

9. The vehicle underbody fairing apparatus of claim 1, wherein the tapered aerodynamic surface has a plurality of perforations.

10. A vehicle underbody fairing apparatus for reducing aerodynamic drag caused by a vehicle wheel assembly supporting a vehicle body from thereunder, comprising:
a fairing body having a fairing front end, a fairing rear end, and a tapered aerodynamic surface comprising a bottom section flanked by left and right side sections which together extend from the fairing front end to the fairing rear end with a substantially U-shaped cross-section that tapers in both height and width from a fairing front end height and width that are substantially equivalent to the height and width respectively of the vehicle wheel assembly to a vertex at the fairing rear end; and
means for mountably for securing the fairing body to an underside surface of the vehicle body, so that the fairing front end is adjacent to and downstream of the vehicle wheel assembly, the bottom section of the tapered aerodynamic surface rises towards the underside surface of the vehicle body as the tapered aerodynamic surface extends downstream from the fairing front end to the fairing rear end, and the vertex is at substantially the same level as the underside surface of the vehicle body, whereby the mounted fairing body reduces the size of a recirculation zone formed under the vehicle body immediately downstream of the vehicle wheel assembly.

11. The vehicle underbody fairing apparatus of claim 10, wherein the fairing body includes a front panel connected edgewise to the tapered aerodynamic surface at the fairing front end.

12. The vehicle underbody fairing apparatus of claim 10, wherein the bottom section of the tapered aerodynamic surface has a recessed channel for channeling airflow coming from under an axle of the vehicle wheel assembly.

13. The vehicle underbody fairing apparatus of claim 10, wherein the tapered aerodynamic surface is contoured so as to be without sharp edges.

14. The vehicle underbody fairing apparatus of claim 10, wherein at least one of the height and width of the substantially U-shaped cross-section tapers at a non-uniform rate so that the bottom section is curved if the height tapers at the non-uniform rate and the left and right side sections are curved if the width tapers at the non-uniform rate.

15. The vehicle underbody fairing apparatus of claim 10, wherein the tapered aerodynamic surface has a plurality of perforations.

16. An aerodynamic semi-trailer for use in tractor-trailer towing arrangements, comprising:
a trailer body with a trailer front end and a trailer rear end;
a rear wheel assembly supporting the trailer rear end from thereunder;
a hitch located under the trailer front end for connecting the trailer body to a tractor so that a drive wheel assembly of the tractor supports the trailer front end from thereunder; and
a fairing body located under the trailer body between the hitch and the rear wheel assembly, said fairing body having a fairing front end adjacent to and downstream of the drive wheel assembly of the tractor when the trailer body is hitched thereto, a fairing rear end downstream of the fairing front end, and a tapered aerodynamic surface comprising a bottom section flanked by left and right side sections which together extend downstream from the fairing front end to the fairing rear end with a substantially U-shaped cross-section that tapers in both height and width, said bottom section rising towards the underside surface of the trailer body as the tapered aerodynamic surface extends downstream from the fairing front end to the fairing rear end,
whereby the fairing body reduces the aerodynamic drag caused by the drive wheel assembly of the tractor by reducing the size of a recirculation zone formed under the trailer body immediately downstream of the drive wheel assembly.

17. The aerodynamic semi-trailer of claim 16, wherein the width of the substantially U-shaped cross-section at the front end is substantially equivalent to the width of the drive wheel assembly.

18. The aerodynamic semi-trailer of claim 17, wherein the height of the substantially U-shaped cross-section at the front end is substantially equivalent to the height of the drive wheel assembly.

19. The aerodynamic semi-trailer of claim 16, wherein the substantially U-shaped cross-section tapers to a vertex at the fairing rear end, and the fairing body is located under the trailer body so that the vertex is at substantially the same level as the underside surface of the trailer body.

20. The aerodynamic semi-trailer of claim 16, wherein the fairing body includes a front panel connected edgewise to the tapered aerodynamic surface at the fairing front end.

21. The aerodynamic semi-trailer of claim 16, wherein the bottom section of the tapered aerodynamic surface has a recessed channel for channeling airflow coming from under an axle of the drive wheel assembly.

22. The aerodynamic semi-trailer of claim 16, wherein the tapered aerodynamic surface is contoured so as to be without sharp edges.

23. The aerodynamic semi-trailer of claim 16, wherein at least one of the height and width of the substantially U-shaped cross-section tapers at a non-uniform rate so that the bottom section is curved if the height tapers at the non-uniform rate and the left and right side sections are curved if the width tapers at the non-uniform rate.

24. The aerodynamic semi-trailer of claim 16, wherein the tapered aerodynamic surface has a plurality of perforations.

* * * * *